July 22, 1958     I. W. LICHTENFELS     2,844,780
DYNAMIC BRAKE CONTROL
Filed Feb. 25, 1955
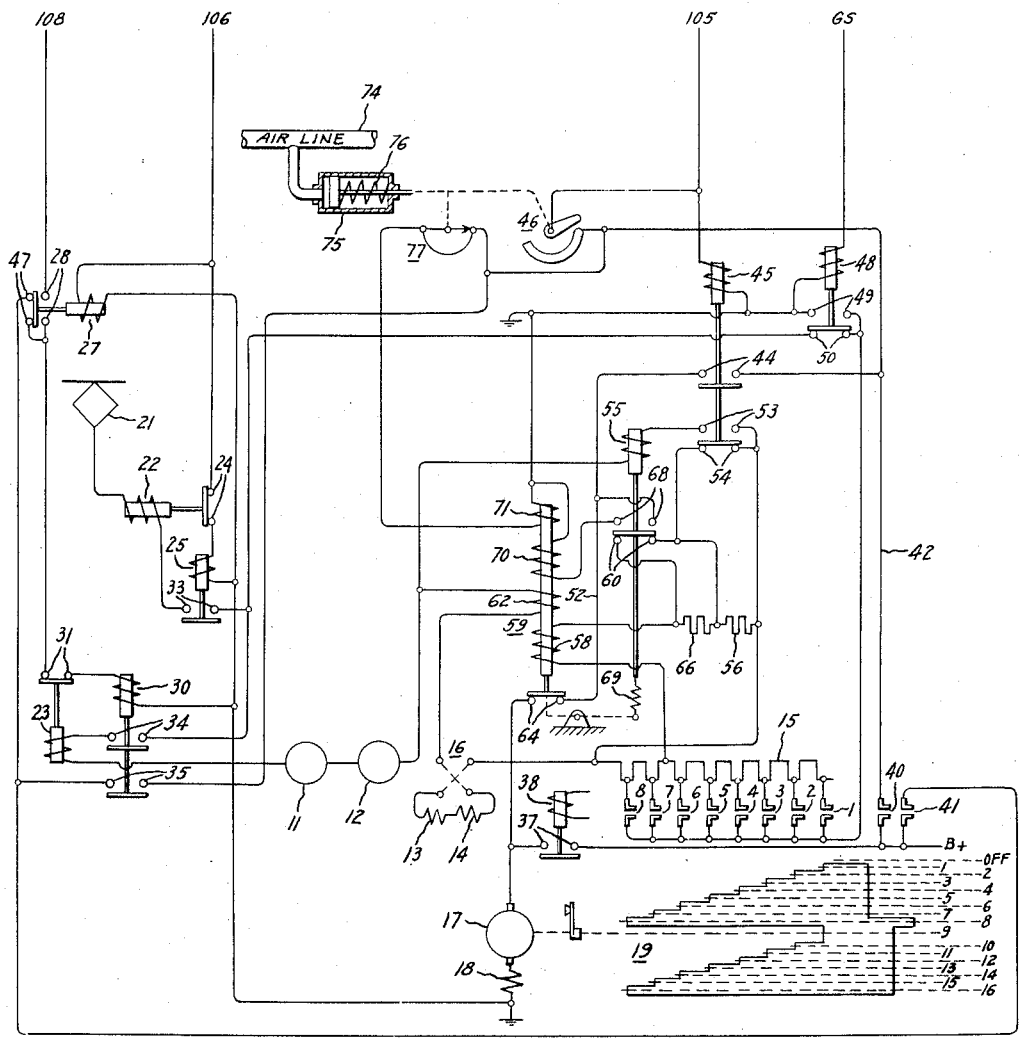
Inventor:
Ira W. Lichtenfels,
by
His Attorney.

United States Patent Office 2,844,780
Patented July 22, 1958

2,844,780

DYNAMIC BRAKE CONTROL

Ira W. Lichtenfels, Harborcreek, Pa., assignor to General Electric Company, a corporation of New York Application February 25, 1955, Serial No. 490,561

12 Claims. (Cl. 318—367)

My invention relates to motor control systems for electric traction drives and more particularly to the provision of means for locally establishing and quickly applying full dynamic braking irrespective of continuity of train line control circuits.

At the present time it is common practice to place the circuit controlling contactors near the driving traction motor and remotely operate them from a master controller located at one end of the vehicle or in one car of a multiple unit train of self powered units. The basic circuits for accomplishing automatic acceleration and automatic dynamic braking at high rates are well known in this art. Previous circuits have depended on train line energization to establish and maintain the braking circuits. Anticipation to prevent over-shooting of the control system has been obtained by several means such as ballast resistors, inductive couplings, and anticipating windings in the tractor motors.

Therefore, it is an object of this invention to provide a simple and reliable means of locally establishing and maintaining a dynamic braking progression without depending on train line signals and without overshooting.

In carrying out my invention in one form, the automatic cam controller motor is run during dynamic braking until the drum controller is moved enough to shunt resistance from the loop dynamic braking circuit to cause a current of approximately one-half the allowable braking current to flow through the traction motors and their respective fields. The calibration relay, which is connected to sense the current of the loop circuit, is opened to stop the controller motor at this fictitious limit and allow the fields of the traction motors to build up. Then the calibration relay is recalibrated so that it will reopen at the rated dynamic braking current.

The features of my invention which I believe to be novel are set forth with particularity in the appended claims. For a more complete understanding of my invention, both as to its organization and method of operation, together with further objects and advantages, reference should now be had to the drawing wherein:

In the single figure I have schematically illustrated a control system embodying my invention.

Now referring to the drawing, I have shown my invention in one form as applied to the control of two direct current traction motors 11 and 12 which are serially connected and have the series field windings 13 and 14 and a main load resistor shown schematically as 15. In order that the field windings may be reversed, they are connected through the reversing switch 16. In order that the load resistor 15 may be shunted out by the closing of the connectors 1, 2, 3, 4, 5, 6, 7 and 8, I have shown the automatic controller as having a cam controller motor 17 with a series field winding 18 with an expanded view of the drum controller itself shown at 19 being mechanically connected thereto. The drum controller has several steps or notches, shown as eight, but may be many more in some applications.

During acceleration of the serially connected traction motors 11 and 12, power is received from the rail current collector or the pantograph 21 and over-current protection is afforded by the normally closed overload relays 22 and 23. To start the train, the operator energizes the train lines 106, GS and 108. When the train line 106 is energized, power is supplied through the contacts 24 of the overload relay 22 to energize a normally open relay 25.

At the same time the relay 27 is energized from the train line 106 to shunt the contacts 28 which locally applies the train line 108 signal to energize the normally open relay 30 through the normally shunted contacts 31 of the overload relay 23.

Energizing the relays 25 and 30 shunts the contacts 33 and 34 respectively to connect the motors 11 and 12 to the pantograph 21. The energization of the relay 30 also shunts the interlock holding contacts 35. It is preferred that the relays 23 and 30 and the contacts 31, 34 and 35 be mounted as a unit which I shall refer to as an over-current device.

At this time the controller motor 17 is energized from battery voltage through the line 36 and through the relay contacts 37 which are biased to remain open until closed by the energization of the relay coil 38. Whenever this coil 38 is energized during acceleration, the controller motor 17 will rotate the drum controller 19 to shunt a portion of the load resistor 15 by closing contactors 1, 2, 3, 4, 5, 6, 7 and 8 in a predetermined arrangement of steps or notches. The control of the relay contacts 38 is not a portion of this invention and will not be further described therein. Suitable automatic control of the controller motor during acceleration is fully explained in the Letters Patent 2,566,898, issued September 4, 1951, to myself and H. G. Moore and assigned to the asignee of the present application. The Letters Patent 2,566,898, also shows suitable means for energizing train lines.

When the controller motor 17 has been rotated to the full acceleration position shown as notch 8, the contactors 40 and 41 are closed to energize the lines 42 and 43 respectively. The line 42 passes to the one side of the normally open contacts 44, of relay 45 and the sliding switch 46. The line 43 passes to the normally shunted contacts 47 of the relay 27 to locally energize the relay 30 when the train line 106 is deenergized in preparation for dynamic braking. Thus, the motor circuit is prepared for dynamic braking without any train line signal. Deenergizing the train lines 108, 106 and GS releases the associated relay 48 to shunt the contacts 50 which connect the traction motors 11 and 12, the fields 13 and 14 (which are now reversed), the load resistor 15, the contacts 34 and the overload coil 23 is a closed loop circuit.

When the local drum controller is fully accelerated and the master controller in the control cab is turned to the "off" position, the train line GS is de-energized to de-energize the coil of relay 48 and open the contacts 49 to disconnect the motors from ground. The train line 106 is de-energized and contacts 47 are shunted to energize the relay 30 locally to shunt contacts 34 and the interlock holding contacts 35 which are thus connected in circuit with the contactor 40. At the same time, the contacts 50 of relay 48 are shunted to immediately place the load resistor 15 across the serially connected motors 11 and 12 and their respective field windings 13 and 14 to form the dynamic braking loop circuit. The resistance of the loop circuit with this load resistor 15 thus connected is sufficient to prevent braking current of a magnitude which will appreciably slow the train. It should be noted that full over-current protection is afforded by the coil 23 and contacts 34.

In order that the traction motors 11 and 12 will be disconnected from the power source when the master controller is turned to the "off" position, the de-energization of train line 106 de-energizes the coil of relay 25 to open the shunted contacts 33. Thus, the loop circuit is connected for coasting and prepared for the application of braking.

When the engineman in the lead cab requires dynamic braking of the vehicle, he applies a signal to train wire 105 to energize the coil of relay 45 and shunt the contacts 44 to connect the line 42 to the line 52 and shunt the contacts 53 to place the recalibration relay 55 in circuit across the field windings 13 and 14. The shunting of contacts 44 which energizes the line 52 from the line 42 also starts the controller motor 17 for driving the drum controller 19 to shunt portions of the load resistor 15 by closing contactors 1, 2, 3, 4, etc. This shunting of the load resistor 15 increases the current through the loop circuit including the traction motors 11 and 12, the field windings 13 and 14, the resistor 15, and shunted contacts 50 of relay 48. At the same time the contacts 53 of the relay 45 are shunted, the contacts 54 are open to place the resistor 56 in series with the shunt coil 58 of calibration relay 59.

In order to sense the current of the loop circuit, the coil of the recalibration relay 55 is connected across a portion of the loop circuit. It is preferred that this connection be across the field windings 13 and 14 in series with the shunted contacts 53 of the relay 45. As the current in this loop circuit increases, the voltage drop across the field windings 13 and 14 increases to energize the operating coil of relay 55 to move the relay armature against its bias to open the relay contacts 60 which are normally shunted by this armature.

The calibration relay 59 also has its shunt coil 58 connected across a portion of the loop circuit to sense the current therethrough. One such connection is shown as across a portion of the load resistor 15. A series coil 62 of the calibration relay 59 may be connected to sense the current of the loop directly. When the current of the loop circuit increases, the current increases through the series coil 62 and the main load resistor 15 to apply an increasing voltage across the shunt 58 coil of the calibration relay 59 and its series impedance shown as resistor 56. In order to calibrate the relay 59 to energize and open its contacts 64 at a low current, the contacts 60 of the recalibration relay 55 are connected to shunt the resistor 66 until the current through the field windings 13 and 14 reaches a value of approximately two-thirds the allowable dynamic braking current. So long as the contacts 60 remain shunted and the contacts 68 remain open, the calibration relay 59 will be energized at a current that is appreciably below the allowable braking current of the system. It should be noted that the shunt coil 58 of the calibration relay 59 is connected across the portion of the resistor 15 which is last to be shorted from the circuit.

The two similar resistors 56 and 66 are shown in the drawing so that the original energization of the calibration relay 59 will be when the current is approximately one-half of the allowable current in the loop circuit. It is often preferred that a single voltage divider resistor be used with the contacts 60 connected to the voltage tap and one end thereof respectively, and the contacts 54 connected to the voltage tap and the other end thereof respectively. Of course, the contacts 54 could be connected to each end of the resistor.

I have also shown the calibration relay 59 as having the differential coils 70 and 71. The coil 70 is a differential coil which is energized by the shunting of the contacts 68 of the recalibration relay 55. When this coil is added to the circuit by the energization of the relay 55, this will recalibrate the calibration relay 59 to raise the point of energization. A further means for recalibrating the relay 58 would be to have the relay 55 resiliently connected to increase the bias on the calibration relay 59. Such a mechanical connection is shown using the spring 69.

The most efficient use of dynamic braking is at high speeds where the conventional mechanical braking would cause excessive wear on the brake shoes. However, at slower speeds air brakes are more effective. Therefore, I contemplate the use of air brakes in conjunction with my dynamic braking.

At the time the operator in the lead cab energizes the train line 105, the air pressure in the air line, a portion of which is shown as 74, increases to move the piston 75 against the bias of the spring 76. As this piston moves it increases the resistance of the rheostat 77 to reduce the effect of the differential coil 71. This of itself recalibrates the calibration relay 59 to apply dynamic braking as the air pressure builds up.

The movement of the piston 75 also closes the switch 46 to apply local battery power from the line 42 to insure energization of the relay 45 even without a signal from the train line 105. It is thus apparent that the application of dynamic braking is not dependent on the train line 105.

Of course, any one or all of the recalibration means, the resistor 66, the spring 69, or the differential coils 70 and 71 may be used to control the final circuit rating at which the calibration relay 59 is energized. However, for the purpose of simplicity, I will only discuss the effect of the resistor 66.

The problem that is to be overcome by these connections is easily understood by consideration of the phenomena wherein the field of a direct current motor is built up more slowly than the current through the field winding. For instance, if the allowable loop circuit dynamic braking current is a predetermined allowable value such as 200 amperes and controller motor 17 is operated at a high speed and initially stopped at the point where some lesser predetermined value such as 100 amperes is flowing through the field windings 13 and 14, the fields will continue to build up, and the voltage produced by the traction motors 11 and 12 will continue to increase until the current becomes stable at the allowable value which is nearly double the original calibration point for stopping of the controller motor 17.

In order that the calibration relay 59 will not be recalibrated before it is initially energized, the recalibration relay 55 is energized at somewhat higher current than the initial energization of the calibration relay 59. The relay 55 may be designed to be energized by a current of approximately 135 amperes flowing in the loop circuit and to remain energized so long as the current through the field windings 13 and 14 remains in excess of 75 amperes. If only the resistors 56 and 66 are used to recalibrate the calibration relay 59, the series impedence for the shunt coil of the calibration relay 59 is approximately doubled by the addition of a series resistor 67 and this relay will no longer energize at 100 amperes but will now energize at 205 amperes and de-energize at approximately 195 amperes. The particular currents of energization and de-energization once the original overshoot has been eliminated are not a portion of this invention and will not be further explained. However, it should be noted that the number of available notches will control the current spread between energization and de-energization of this calibration relay 59.

Assume that the current builds up to 100 amperes after the controller motor 17 has rotated the drum controller 20 through steps 9, 10, 11 and 12. The cam controller motor 17 will be stopped by the energization of the calibration relay 59. When the current reaches 135 amperes, relay 55 is energized to remove the shunt from the resistor 66 and recalibrate calibration relay 59 to de-energize at 195 amperes to start the controller motor 17. If the total current never reaches 195 amperes, the calibration relay 59 is constructed to have a sufficient mechanical delay to allow the fields caused by the field windings 13 and 14 to stabilize at a current near 200 amperes. The shunting of contacts 64 after the initial opening will not cause a sufficient change of the field strength produced by the windings 13 and 14 to cause the braking current to dangerously overshoot the allowable value. Thus, I am able to reach the full dynamic braking current in a very short time without the use of ballast resistors, inductive couplings or anticipating windings within the traction motors.

In summary, I have provided a means for controlling the current during the initial application of automatic dynamic braking by creating a fictitious calibration point and allowing the braking current to freely overshoot the fictitious value without danger of its overshooting the allowable current value to damage the circuit components. This allows the controller motor 17 to run at a predetermined full speed during the initial application of dynamic braking. Of course, the current values of 75, 100, 135, 195, 200, and 205 amperes are only exemplary and may be adjusted to match any motors where dynamic braking is to be used. Also, the controller may be of any type that may be driven to shunt a load resistor in predetermined arrangement of shunting increments.

While I have shown and described a particular embodiment of my invention, it will be understood, of course, that I do not wish to be limited thereto since many modifications may be made and, I intend by the appended claims to cover any such modifications as fall within the true spirit and scope of my invention.

What I claim as new and desire to secure by Letters Patent of the United States is:

1. A dynamic braking control circuit for a traction motor having a load resistor connected thereacross to provide a loop circuit, comprising a controller connected to shunt portions of the load resistor in a predetermined arrangement, a controller motor drivingly connected to said controller and adapted to intermittently operate at a predetermined speed, a calibrating relay having an armature, an operating coil and contacts, said armature being biased to normally shunt said contacts, said relay coil being electrically connected in circuit with said loop circuit to sense the current therein, said contacts being electrically connected between said controller motor and a source of power for said controller motor during dynamic braking, a calibrating resistor connected in series with said relay coil to determine the current in said loop circuit at which said relay will initially energize to open said contacts and stop said controller motor to prevent further shunting of said load resistor, means for automatically recalibrating said calibration relay after the initial energization thereof to determine the current value at which said calibration relay will de-energize to start said controller motor and re-energize thereafter to stop said controller motor and prevent shunting said load resistor whenever a predetermined current value in said loop circuit is reached.

2. A dynamic braking control circuit for a traction motor having a load resistor connected thereacross to provide a loop circuit, comprising a controller connected to shunt portions of the load resistor in a predetermined arrangement, a controller motor drivingly connected to said controller, a calibrating relay having an armature, an operating coil and contacts, said armature being biased to normally shunt said contacts, said relay coil being electrically connected in circuit with said loop circuit to sense the current therein, said contacts being electrically connected between said controller motor and a source of power for said controller motor during dynamic braking, a calibrating resistor connected in series with said relay coil to determine the current in said loop circuit at which said relay will initially energize to open said contacts and stop said controller motor to prevent further shunting of said load resistor, a second calibrating resistor connectable in series with said first calibrating resistor and said relay coil to determine the current value at which said relay will de-energize to start said controller motor and re-energize thereafter to stop said controller motor and prevent shunting said load resistor whenever a predetermined current value in said loop circuit is reached, and means connected to sense the current in said loop circuit for automatically connecting said second calibrating resistor in circuit after the first energization of said relay.

3. A dynamic braking control circuit for a traction motor having a load resistor connected thereacross to provide a loop circuit, comprising a drum controller connected to shunt portions of the load resistor in a predetermined arrangement, a controller motor drivingly connected to said controller, a calibrating relay having normally shunted contacts connected between said controller motor and its source of power during dynamic braking, a coil of said calibration relay electrically connected in circuit with said loop circuit to sense the current therein and operatively connected to open said contacts upon energization, a first calibrating resistor connected in series with said relay coil to determine the current in said loop circuit at which said relay will initially energize to open said contacts, a second calibrating resistor connected in series with said first calibrating resistor and said relay coil to determine the current value in said loop circuit at which said calibrating relay will de-energize to start said controller motor and re-energize thereafter to stop said controller motor and prevent shunting said load resistor, and another relay having an operating coil and contacts connected to the ends of said second calibration resistor, an armature of said other relay biased to shunt said contacts of said other relay until said operating coil is energized, said coil of said other relay being electrically connected across a portion of said loop circuit to sense the current therein and being so wound as to energize when the current in said loop circuit is greater than the current necessary to cause the initial energization of said calibration relay and less than the current at which said calibration relay de-energizes with both of said calibrating resistors electrically connected in series with said coil of said calibration relay.

4. A dynamic braking control circuit for a traction motor having a load resistor connected thereacross to provide a loop circuit, comprising a drum controller connected to cam operated contactors to shunt portions of said load resistor in a predetermined arrangement, a cam controller motor drivingly connected to said controller, a calibrating relay having contacts, an operating coil and an armature biased to shunt said contacts, said contacts being electrically connected between said cam controller motor and its source of power during dynamic braking, said coil of said calibration relay being electrically connected across a portion of said load resistor to sense the current therein and being operatively connected to move said armature to open said contacts, a calibrating resistor having a voltage dividing tap thereon and connected in series with said coil of said calibration relay to determine the current in said loop circuit at which said relay will energize to stop said controller motor, and another relay having contacts and an armature biased to shunt said contacts, said contacts being electrically connected to said voltage tap and one end of said resistor respectively, the coil of said other relay being electrically connected to sense the current in said loop circuit and operatively connected to open said contacts of said other relay at a current value in said loop greater than the initial energization of said calibration relay and less than de-energization level of said calibration relay thereafter.

5. A dynamic braking circuit for a traction motor having a load resistor connected thereacross to provide a loop circuit, comprising a controller connected to shunt portions of the load resistor in a predetermined arrangement, a controller motor drivingly connected to said controller, a calibrating relay having an armature, a first operating coil, a second operating coil and contacts, said armature being biased to normally shunt said contacts, said first relay coil being electrically connected in circuit with said loop circuit to sense the current therein, said relay contacts being electrically connected between said controller motor and the source of power of said controller motor for disconnecting said motor from said source during dynamic braking, and said second relay coil being connectable across a source of voltage after said calibrating relay has been once energized and being wound to counteract the field of said first relay coil to determine the current value at which said relay will de-energize to start said controller motor and re-energize thereafter to stop said controller motor and prevent shunting said load resistor whenever a predetermined current value in said loop circuit is reached.

6. A dynamic braking control circuit for a traction motor having a load resistor connected thereacross to provide a loop circuit, comprising a drum controller connected to cam operated contactors to shunt portions of said load resistor in a predetermined arrangement, a cam controller motor drivingly connected to said controller, a calibrating relay having contacts, an operating coil, a differential coil and an armature biased to shunt said contacts, said contacts being electrically connected between said cam controller motor and its source of power during dynamic braking, said operating coil of said calibration relay being electrically connected to sense the current in said loop circuit and being operatively connected to move said armature to open said contacts, a calibrating resistor having a voltage dividing tap thereon and connected in series with said operating coil of said calibration relay to determine the current in said loop circuit, at which said relay will energize to stop said controller motor, another relay having contacts and an armature biased to shunt said contacts, said contacts being electrically connected to said voltage tap and one end of said resistor respectively, the coil of said other relay being electrically connected to sense the current in said loop circuit and operatively connected to open said contacts of said other relay at a current value in said loop circuit greater than the initial energization of said calibration relay and less than the de-energization level of said calibration relay thereafter, and another set of contacts on said other relay adapted to be shunted when said relay is energized, said differential relay coil and said other set of contacts being serially connected across a source of power so that said calibration relay is energized at a higher value of current after said other relay is energized.

7. A dynamic braking control circuit for a traction motor having a load resistor connected thereacross to provide a loop circuit, comprising a controller connected to shunt portions of the load resistor in a predetermined arrangement, a controller motor drivingly connected to said controller, a calibrating relay having an armature, an operating coil and contacts, said armature being biased to normally shunt said contacts, said relay coil being electrically connected in circuit with said loop circuit to sense the current therein, said contacts being electrically connected between said controller motor and the source of power for said controller motor during dynamic braking, a calibrating resistor connected in series with said relay coil to determine the current in said loop circuit at which said relay will initially energize to open said contacts and stop said controller motor to prevent further shunting of said load resistor, a second relay having an armature and an operating coil connected to sense the current in said loop circuit, said armature of said second relay being mechanically connected to said calibration relay to change the bias thereof upon the energization of said second relay to determine the current value at which said calibration relay will de-energize to start said controller motor and re-energize thereafter to stop said controller motor and prevent shunting said load resistor whenever a predetermined current value in said loop circuit is reached.

8. A dynamic braking control circuit for a remotely controlled vehicle having an air braking system and a traction motor adapted to have a load resistor connected thereacross to provide a dynamic braking loop circuit, comprising a controller connected to shunt portions of the load resistor in a predetermined arrangement, a controller motor drivingly connected to said controller, a calibrating relay having an armature, an operating coil and contacts, said armature being biased to normally shunt said contacts, said relay coil being electrically connected in circuit with said loop circuit to sense the current therein, said contacts being electrically connected between said controller motor and the source of power for said controller motor during dynamic braking, a calibrating resistor connected in series with said relay coil to determine the current in said loop circuit at which said relay will initially energize to open said contacts and stop said controller motor to prevent further shunting of said load resistor, a second relay having an armature and an operating coil connected to sense the current in said loop circuit, said armature of said second relay being mechanically connected to said calibration relay to change the bias thereof upon the energization of said second relay to determine the current value at which said calibration relay will de-energize to start said controller motor and re-energize thereafter to stop said controller motor and prevent shunting said load resistor whenever a predetermined current value in said loop circuit is reached, a third relay having contacts in circuit with said calibration relay contacts for connecting said calibration relay contacts to a source of power during dynamic braking, means for energizing said third relay from a train line, and other means for energizing said third relay in response to an increase in pressure in the air braking system to provide for dynamic braking regardless of train line failure.

9. A dynamic braking circuit for a traction motor having a load resistor connected thereacross to provide a loop circuit, comprising an over-current protective means adapted to be connected in circuit with said traction motor both during motoring and braking, a controller connected to shunt portions of the load resistor in a predetermined arrangement, a controller motor drivingly connected to said controller, a calibrating relay having an armature, an operating coil and contacts, said armature being biased to normally shunt said contacts, said relay coil being electrically connected in circuit with said loop circuit to sense the current therein, said contacts being electrically connected in circuit with said controller motor for stopping said controller motor during dynamic braking, and means for recalibrating said calibration relay after said calibration relay has once energized to determine the current value at which said calibration relay will de-energize to start said controller motor and re-energize thereafter to stop said controller motor and prevent shunting said load resistor whenever a predetermined current value in said loop circuit is reached.

10. A dynamic braking circuit for a self-propelled vehicle controlled by train lines and having a traction motor adapted to have a load resistor connected thereacross to provide a loop dynamic braking circuit, comprising an over-current protective means adapted to be connected in circuit with said traction motor both during motoring and braking, means for closing said device during acceleration and during dynamic braking, means for maintaining said device closed during dynamic braking so long as no over-current sufficient to trip said device occurs, a controller connected to shunt portions of the load resistor in a predetermined arrangement, a controller motor drivingly connected to said controller, a calibrating relay having an armature, an operating coil and contacts, said armature being biased to normally shunt said contacts, said relay coil being electrically connected in circuit with said loop circuit to sense the current therein, said contacts being electrically connected in circuit with said controller motor for stopping said controller motor during dynamic braking, and means for recalibrating said calibration relay after said calibration relay has once energized to determine the current value at which said calibration relay will deenergize thereafter to stop said controller motor and prevent shunting said load resistor whenever a predetermined current value in said loop circuit is reached.

11. A dynamic braking control circuit for a traction motor having a load resistor connectable thereacross to provide a loop circuit wherein the load resistor is adapted to be shunted from the circuit in a plurality of steps by a controller driven by a high speed controller motor, comprising a calibration relay having normally closed contacts adapted to open the controller motor circuit to stop the controller motor, first circuit means connected to cause the initial energization of said calibration relay when dynamic braking current in the loop circuit is substantially less than a predetermined allowable braking current thereby allowing the loop circuit current to build up to said predetermined current after the controller motor has been stopped, and other circuit means cooperating with said first means to cause deenergization of said calibration relay when the dynamic braking current drops below said predetermined current and to reenergize said calibration relay when said braking current rises above said predetermined current whereby said predetermined current is maintained.

12. A dynamic braking control circuit for a traction motor having a load resistor connectable thereacross to provide a loop circuit wherein the load resistor is adapted to be shunted from the circuit in a plurality of steps by a controller driven by a high speed controller motor, comprising a calibrated normally deenergized electric device operably connected to a switching means which is normally closed and when opened causes the deenergization of the controller motor, first circuit means connected to cause the initial energization of said device to open said switching means when dynamic braking current in the loop circuit is substantially less than a predetermined allowable braking current thereby allowing the loop circuit current to build up to said predetermined current after the controller motor has been stopped, and other circuit means cooperating with said first circuit means to cause deenergization of said device when said braking current decreases below said predetermined current and to reenergize said device when said braking current increases above said predetermined current whereby said predetermined current is substantially maintained.

References Cited in the file of this patent
UNITED STATES PATENTS

| | | |
|---|---|---|
| 1,894,971 | Austin et al. | Jan. 24, 1933 |
| 2,185,861 | McNairy | Jan. 2, 1940 |
| 2,400,971 | Barclay | May 28, 1946 |
| 2,748,335 | Purifoy et al. | May 29, 1956 |